US006285681B1

United States Patent
Kolze et al.

(10) Patent No.: US 6,285,681 B1
(45) Date of Patent: Sep. 4, 2001

(54) VARIABLE LENGTH BURST TRANSMISSION OVER THE PHYSICAL LAYER OF A MULTILAYER TRANSMISSION FORMAT

(75) Inventors: Thomas J. Kolze, Phoenix, AZ (US); Steven E. Anderson; Victor T. Hou, both of La Jolla, CA (US)

(73) Assignee: General Instrument Corporation, Horsham, PA (US)

( * ) Notice: Subject to any disclaimer, the term of this patent is extended or adjusted under 35 U.S.C. 154(b) by 0 days.

(21) Appl. No.: 09/059,113

(22) Filed: Apr. 13, 1998

Related U.S. Application Data

(63) Continuation of application No. PCT/US96/16923, filed on Oct. 23, 1996
(60) Provisional application No. 60/006,042, filed on Oct. 24, 1995.

(51) Int. Cl.[7] .................................................. H04Q 11/04
(52) U.S. Cl. .......................... 370/442; 370/395; 370/436; 714/755; 714/774
(58) Field of Search .................................. 370/282, 294, 370/321, 337, 347, 395, 430, 436, 437, 442, 458, 473, 478, 480, 486, 487, 498; 348/7, 10, 12; 375/222, 261, 298; 455/3.1, 5.1; 714/755, 774

(56) References Cited

U.S. PATENT DOCUMENTS

| | | | |
|---|---|---|---|
| 5,535,206 | * 7/1996 | Bestler et al. | 348/12 |
| 5,570,355 | * 10/1996 | Dail et al. | 370/395 |
| 5,577,087 | * 11/1996 | Furuya | 375/222 |
| 5,666,358 | * 9/1997 | Paratore et al. | 370/347 |
| 5,696,765 | * 12/1997 | Safadi | 370/436 |
| 5,699,369 | * 12/1997 | Guha | 714/774 |
| 5,734,652 | * 3/1998 | Kwok | 370/395 |
| 5,745,837 | * 4/1998 | Fuhrman | 455/5.1 |
| 5,784,597 | * 7/1998 | Chiu et al. | 370/486 |

FOREIGN PATENT DOCUMENTS

| | | |
|---|---|---|
| 0 581 716 | 2/1994 | (EP) . |
| 0641087-A2 | * 1/1995 | (EP) . |
| 0 637 185 | 2/1995 | (EP) . |

OTHER PUBLICATIONS

McAuley, Reliable Broadband Communication Using a Burst Erasure Correcting Code, Bellcore, ACM SIGCOMM '90, pp. 1–10, Sep. 1990.*
Ohuchi, M. et al., "Application of Modulation Level–Controlled Radio System to ATM Networks," *Electronics & Communications in Japan*, Part I—Communications, vol. 77, No. 6, Jun. 1, 1994, pp. 87–95.
Benelli, G., "Two Concatenated Coding Schemes for ARQ Protocols," *IEE Proceedings*, vol. 136, Pt. I, No. 3, Jun., 1989, pp. 213–219.
Mayorga, A. et al, "Encapsulation versus Protocol Mapping in ATM Interworking with Frame Relay," *Annual Review of Communications*, vol. 47, Jan. 1993, pp. 748–754.

* cited by examiner

*Primary Examiner*—Wellington Chin
*Assistant Examiner*—Frank Duong
(74) *Attorney, Agent, or Firm*—Barry R. Lipsitz

(57) ABSTRACT

Apparatus is provided for communicating data packets in variable length bursts over a physical layer in a multilayer data communication scheme. Each burst contains information data (40, 50, 60, 64, 74, 78, 82) and overhead (30, 32, 34, 36, 38, 42, 44, 62, 66, 76, 80, 84). The overhead includes forward error control (FEC) data (42, 62, 66, 76, 80, 84). Different burst modes (FIG. 2, 3, 4, 5) are provided to enable a trade-off to be made between bandwidth efficiency and data transmission robustness. The burst modes provide different combinations of modulation (such as QPSK and 16-QAM), symbol rates, FEC coding levels and frame and preamble structure. The apparatus is particularly suitable for use in upstream communications over hybrid fiber coax cable television plants.

20 Claims, 4 Drawing Sheets

VARIABLE LENGTH BURST TRANSMISSION OVER THE PHYSICAL LAYER OF A MULTILAYER TRANSMISSION FORMAT

This application claims the benefit of U.S. provisional application No. 60/006,042 filed on Oct. 24, 1995 and is a continuation of PCT/US96./16923 filed Oct. 23, 1996.

BACKGROUND OF THE INVENTION

The present invention relates to the transmission of data over the physical layer in a multilayer data communication scheme, and is particularly applicable to the transmission of upstream messages in a hybrid fiber coaxial transmission system. The invention is useful, for example, in communicating messages from a subscriber terminal to a cable television headend for purposes of providing, e.g., Internet access over a cable television network.

In the past, cable television systems have utilized coaxial cable to carry signals from a headend to individual subscriber terminals. With the advent of new digital television services as well as the desire to carry data to and from subscriber terminals, the increased bandwidth provided by fiber optic cable has become attractive. Implementation of optical fiber networks all the way from the headend to individual subscriber terminals is not currently a practical alternative due to the high cost of building an optical fiber plant in which fiber is run all the way to individual homes. As a compromise, hybrid fiber coax (HFC) plants are being implemented.

In HFC systems, fiber is run from the headend to neighborhood hubs. Existing coaxial cable is then coupled to receive the signals from the optical fiber, for distribution to individual homes.

Various interactive services to be provided by digital transmission systems require a bidirectional link between the headend and individual subscriber terminals. One way to provide a return path from the subscriber terminals back to the headend is to rely on existing telephone lines. However, it would clearly be advantageous to provide bidirectional communication over the same plant, such as an HFC plant, in which the downstream television signals are provided to the subscriber terminals. In order to accomplish this, proposals have been made to develop robust upstream communication systems over HFC plants. For example, single carrier frequency and time division multiple access (F/TDMA) have been proposed to provide a low risk, high capacity approach which offers suitable characteristics for upstream modulation over an HFC system.

In order to implement a practical upstream channel, it would be advantageous to provide various choices to a system operator to accommodate different needs. For example, it would be advantageous to offer a trade-off between data throughput (i.e., bandwidth efficiency), error rate performance (i.e., robustness) and latency. In offering such flexibility, it would be particularly advantageous to offer system operators a frequency agile carrier, choices between different modulation techniques, such as quadrature phase shift keyed (QPSK) and quadrature amplitude modulation (QAM), multiple symbol rates, flexible forward error control (FEC) coding, and flexible frame and preamble structure for the data packets transported over the communication channel. Such choices would allow many opportunities for different system operators to find satisfactory sets of operational modes to serve the needs of subscribers economically and efficiently.

The present invention provides a flexible communication scheme enjoying the aforementioned and other advantages.

SUMMARY OF THE INVENTION

In accordance with the present invention, apparatus is provided for communicating variable or fixed length data packets in variable length bursts over a physical layer in a multilayer data communication scheme. Each burst contains (i) information data and (ii) overhead including forward error control (FEC) data. A programmable block processor groups the information data into blocks according to a selected one of a plurality of available grouping modes. A programmable FEC encoder encodes the blocks with the FEC data according to a selected one of a plurality of possible coding levels. An interface is provided for selecting a burst mode that uses a particular grouping mode provided by the block processor (e.g., in response to a controller associated with the block processor) and a particular coding level established by the FEC encoder to achieve an associated transmission bandwidth efficiency and burst transmission robustness for bursts containing the blocks. The selection of a burst mode can, in addition, enable different latencies to be chosen.

The apparatus can further comprise a programmable modulator for modulating the encoded blocks for transmission according to one of a plurality of available modulation modes. The modulator is responsive to the burst mode selected via the interface for providing a particular one of the modulation modes. For example, the modulation modes can include choices between QPSK and QAM.

In an illustrated embodiment, the bursts are transmitted using time and frequency division multiple access (F/TDMA) with frequency agility over a communication channel.

Each of the grouping modes is associated with a particular symbol rate for the transmission of symbols carried by the bursts. In one embodiment, the block processor blocks protocol data units (PDUs) containing the information data into units that are independent of the PDU length and provides a preamble of a selected length in response to the burst mode selected via the interface. The FEC encoder encodes data from said PDU length-independent units into a particular number of codewords dictated by the selected burst mode. The block processor can allow a final unit derived from the PDUs whose data is contained in a burst to be shorter than previous units contained in the burst. In a departure from conventional practice, which typically seeks to maximize the symbol rate, one or more of the grouping modes may advantageously lower the symbol rate. For example, in certain situations a lower symbol rate may provide a more efficient transmission scheme, such as for constant bit rate users, where the lower rate will allow a closer match of the bit rate to the symbol rate to provide lower latency.

The FEC encoder can be programmable to provide codewords of different lengths. An interleaver can be provided for interleaving codeword symbols whenever the FEC encoder encodes the blocks into two or more codewords.

In one embodiment described, the block processor provides modes of varying burst length, each having one codeword per burst. These bursts are convolutionally coded using at least one of a convolutional FEC code and trellis coded modulation. The convolutional coding can be provided as an inner code concatenated with an error-correcting outer code. With concatenated coding, the outer code can still block the data into multiple codewords, allowing the same trade-offs as without the inner code. In an illustrated embodiment, the blocks comprise asynchronous transfer mode (ATM) cells, and the block processor allocates a particular number of the cells to each block based on the burst mode selected via the interface.

DETAILED DESCRIPTION OF THE INVENTION

The present invention provides multiple transmission modes for flexibility in communication systems where a trade-off between robustness, bandwidth efficiency and latency is desirable. An example of such a communication network is a multichannel upstream environment for hybrid fiber coax (HFC) cable television systems. The invention is applicable to schemes which share a communication path, such as time division multiple access (TDMA) systems using burst modulation.

Various different "lengths" are mentioned herein, including "PDU length," "burst length" and "codeword length." For purposes of this disclosure, PDU length comprises the length (in bytes) of a protocol data unit, such as an asynchronous transfer mode (ATM) cell or an MPEG packet (complying with a standard adopted by the Moving Picture Experts Group). Burst length is defined as the length, in bytes, of a contiguous transmission from a client unit. The burst commences with a preamble. Once all of the data for the burst is transmitted, or the burst's assigned time expires, the transmission ceases and the burst ends. Codeword length is the sum of a number of bits in a self-contained set of information referred to as a codeword and a number of parity bits appended to the codeword. The parity bits enable errors within the codeword to be identified and corrected. Different codewords may contain a different number of PDUs (or a fraction of a PDU). Thus, the ratio of PDU length/codeword length is flexible.

Figure 1:
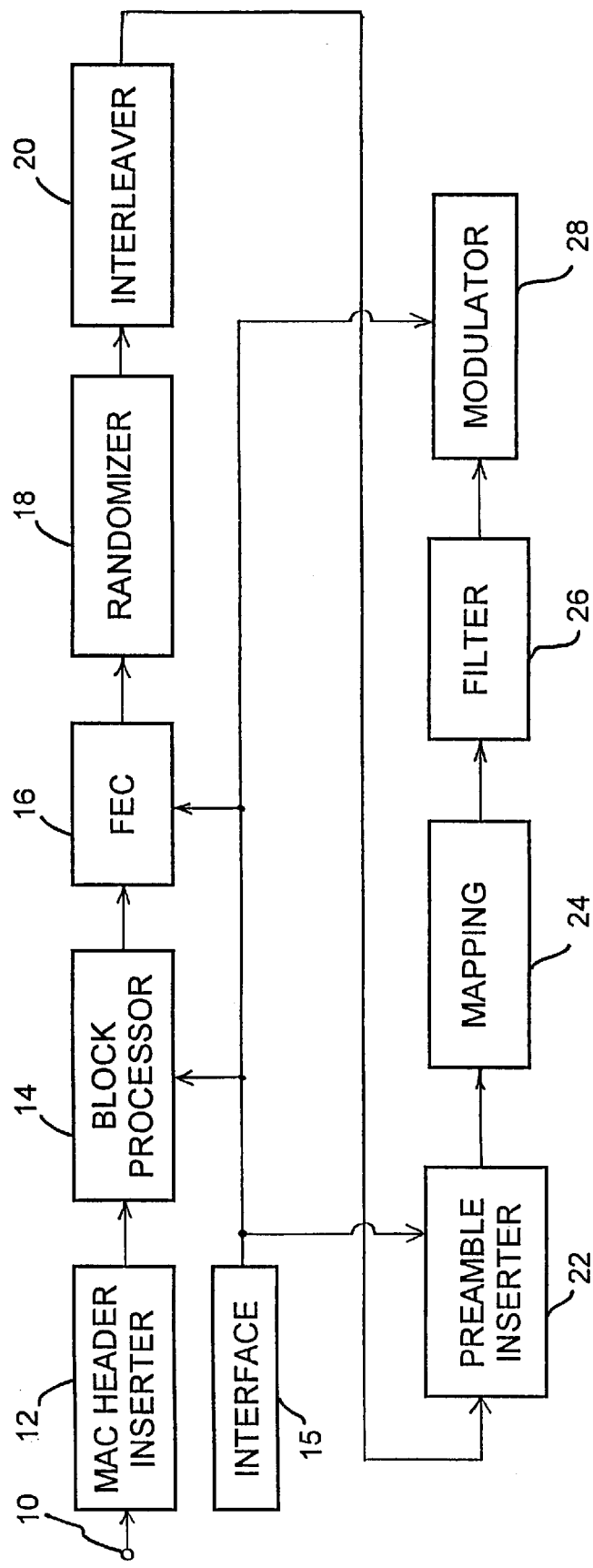
FIG. 1 is a block diagram of apparatus in accordance with the present invention.

FIG. 1 is a block diagram of apparatus in accordance with the present invention. A data stream, such as an ATM cell stream or MPEG packet stream, is input to an optional media access control (MAC) header inserter 12 via terminal 10. The MAC header inserter will insert bandwidth request field (BRF) bytes and/or sequence numbers, if necessary for a given implementation, to the data stream. The ID byte or sequence number is useful in supporting automatic repeat request (ARQ) or other functions at a higher layer than the physical layer. Thereafter, a block processor 14 will group the incoming data into information blocks, which are subsequently encoded into codewords. The block processor, for example, can group various numbers of incoming ATM cells of 53 bytes (and inserted MAC headers) into one codeword, e.g., codewords of one cell, two cells, four cells or four and one-half cells per codeword. The length of the data portion of a codeword can be changed, providing a different number of PDUs per codeword. Typically, the codewords in a given transmission burst will all have the same length, except for the last codeword of a burst, which may be extended with meaningless fill bits or, in a preferred embodiment of the present invention, simply truncated. Overhead in a burst includes a preamble containing a known sequence of symbols inserted by a preamble inserter 22. The preamble may also contain a training sequence inserted by inserter 22 for use in training an adaptive equalizer at the receiver. It is noted that a training sequence could alternatively be provided by prepending a bitstream to the information data. In TDMA implementations, the overhead will also include a guard time which is provided between adjacent bursts as well known in the art. Ramp up and ramp down times are also provided as well known in the art.

Fixed overhead, such as preamble and guard time, is a smaller percentage of a burst containing more data than of a burst containing less data. Accordingly, longer bursts are more bandwidth efficient.

By providing longer codewords (e.g., more ATM cells per codeword), more data can be carried with a smaller percentage of FEC parity in the overall bit count. Accordingly, longer codewords are more bandwidth efficient since the fixed overhead is a smaller percentage of the overall bit count.

On the other hand, a longer codeword may result in a less robust signal, if the level of the forward error control (FEC) coding is not increased (i.e., by adding parity bits) sufficiently with the increase in information data carried by the PDU. Thus, a trade-off exists between the length of the codewords and the FEC coding level. The trade-off is one of bandwidth efficiency versus robustness. In order to enable a communication system operator to optimize data transmission under various conditions such as channel quality, interference, data priority, and the like, the apparatus of the present invention provides different burst modes from which the operator can choose. The burst modes provide different combinations of modulation type, symbol rate, FEC (which can include Trellis coded modulation (TCM), as discussed hereinafter), and preamble length.

As indicated above, the length of the preamble (which includes a unique word for identifying each burst and may also include a training sequence for an adaptive equalizer at the receiver) is dictated by the preamble inserter 22. In establishing the symbol rate, the amount of information data (e.g., the number of ATM cells) provided in each block by block processor 14 is considered, together with other relevant parameters, such as quality of service for ATM implementations. Both the block processor 14 and preamble inserter 22 are responsive to a burst mode control signal received from a user interface (e.g., headend controller) 15. The FEC coding level and modulation type are also responsive to the burst mode control signal, as discussed in greater detail below.

A flexible preamble length of, e.g., one to sixty-four symbols, allows for short preambles in the case of high fidelity HFC plants in pristine portions of the spectrum. In more challenging scenarios, longer preambles are available. Long preambles may be needed and useful for channels with narrow band ingress or severe intersymbol interference (ISI), where the long preambles are useful in training the equalization used to mitigate the plant impairments. Longer preambles may also be useful with certain modulation techniques, such as 16-QAM. The equalization required for each particular user (i.e., modulator) assigned to a channel can be stored and reinstituted upon subsequent slots assigned to that user. Short preambles are enabled for use in certain impairment scenarios, such as where little impulse noise is present. Other impairment conditions which may dictate the use of longer preambles include passband amplitude and group delay nonflatness, multiple reflections of various delay and power levels (echo), dynamic variation of the communication plant, nonlinear distortion (typically dominated by the communication laser and also affected by the optical amplifiers), hum, adjacent channel interference, thermal noise, narrow band ingress, burst noise, impulse noise, and gain.

A randomizer 18 is provided to randomize the codewords output from FEC coder 16 using modulo-2 addition with a data pattern in an attempt to provide balanced utilization of the symbols and symbol transitions in the data stream. The FEC encoder encodes the data from block processor 14 using, e.g., a Reed-Solomon code over Galois Field GF(256) (i.e., eight bits per Reed-Solomon symbol). It is noted that the order of the randomizer and the FEC encoder can be interchanged.

Each of the available burst modes (one of which will be dictated via the burst mode control signal input via interface 15) uses its own particular Reed-Solomon code. The TDMA bursts contain one, two or more codewords, depending on the selected mode. The resulting data stream for each TDMA burst is augmented with the preamble, which is crucial to the acquisition and synchronization processes at the receiver.

The codeword(s) output from FEC encoder 16 are randomized in randomizer 18 and then interleaved in an interleaver 20. Although interleaving in conjunction with TDMA seems incongruent, with impulses possibly "pinging" around in the communication plant (e.g., HFC) for microseconds (a relatively long time for high symbol rates), the benefit of interleaving is substantial. For example, in an ATM implementation several ATM cells may be bundled together into a burst, which still has a short duration since the symbol rate is assumed to be high, and multiple codewords are formed. These codewords are then interleaved. At a receiver, deinterleaving precedes decoding, and the short burst of errors due to "pinging" impulse events are spread among the several codewords rather than concentrating in a single codeword. As a result, significant performance advantage is achieved. It should be appreciated that interleaving is only desirable for burst modes wherein there is more than one codeword per burst.

The following list describes the available tradeoffs in choosing the burst format:
a) length of block code and code rate can both be varied to trade robustness and efficiency;
b) preamble length can be varied to trade robustness and efficiency;
c) bundling PDUs trades latency for TDMA efficiency;
d) for short PDUs, longer block codewords can be used with bundling to achieve efficiency and robustness at the cost of latency; and
e) with long PDUs and coarse slot boundaries, shorter codewords can be used to achieve efficiency at the cost of robustness. Thus, for block codes (e.g., Reed-Solomon) with short PDUs, increasing the codeword length increases the burst length and then provides a three-way trade-off of efficiency, robustness and latency. With long PDUs and coarse slot boundaries, shorter codewords improve efficiency of the slotting, but reduce the product of robustness and efficiency (robustness×efficiency). Shortening the last codeword almost completely obviates the need to use short codewords with long PDUs.

As an alternative to block coded FEC, convolutional coding and/or trellis coded modulation (TCM) may be used. In this embodiment, there is one codeword per burst, and burst length remains flexible, so that trades b) and c) above are still available. Convolutional coding and/or TCM may be used as an inner code, with the outer block codes previously described, in which case all of the performance trade-offs previously discussed are available and unchanged, except that the robustness is improved (at the cost of more complex processing in the transmitter and receiver). Independently of inner coding, multiple codewords of the outer block code may still be used in a burst.

The data stream from the FEC encoder 18 (whether interleaved or not) is prepared (symbol mapped) using a mapping processor 24 for either QPSK or 16-QAM modulation, depending on the burst mode selected via the burst mode control signal via interface 15. It is also possible to provide differentially encoded modulation. The sequence of symbols output from the mapping processor 24 is filtered (pulse-shaped) by filter 26 for 25% Square-Root-Raised-Cosine spectral shaping and QPSK or 16-QAM modulated and transmitted at the prescribed time and carrier frequency allocated in the TDMA/FDMA system. The carrier frequency assignments are agile, with center frequencies selectable from 5 MHz to 40 MHz (e.g., in fine steps—a fraction of 250 Hz). This allows the system to assign channels in a fashion to "step around" particularly bad interference entering the communication system.

Figure 2:
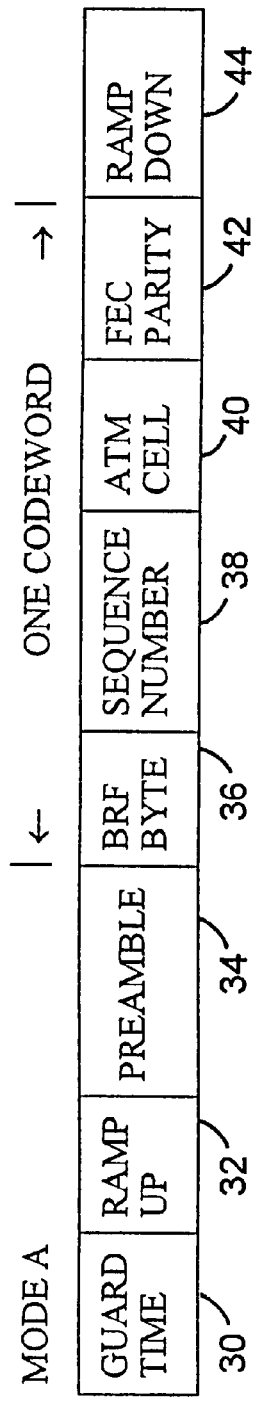
FIG. 2 is a diagram illustrating the structure of a burst length mode wherein a single ATM cell is provided per TDMA burst.
Figure 3:
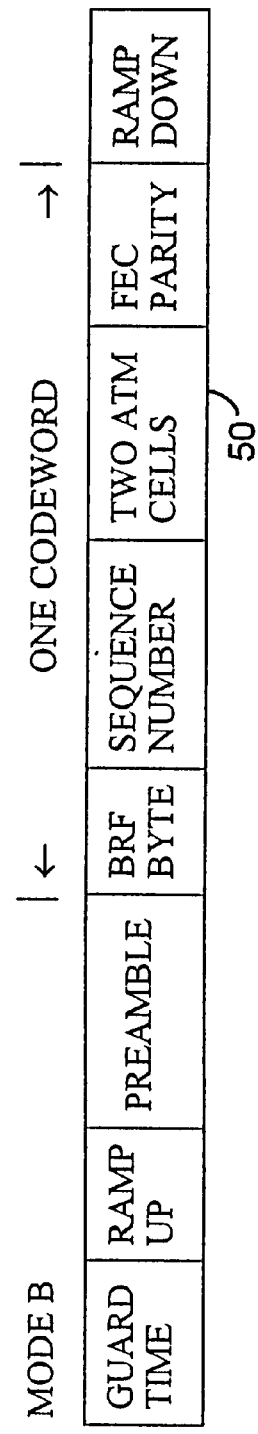
FIG. 3 is a diagram illustrating a burst length mode in which two ATM cells are provided in one codeword per burst.
Figure 4:
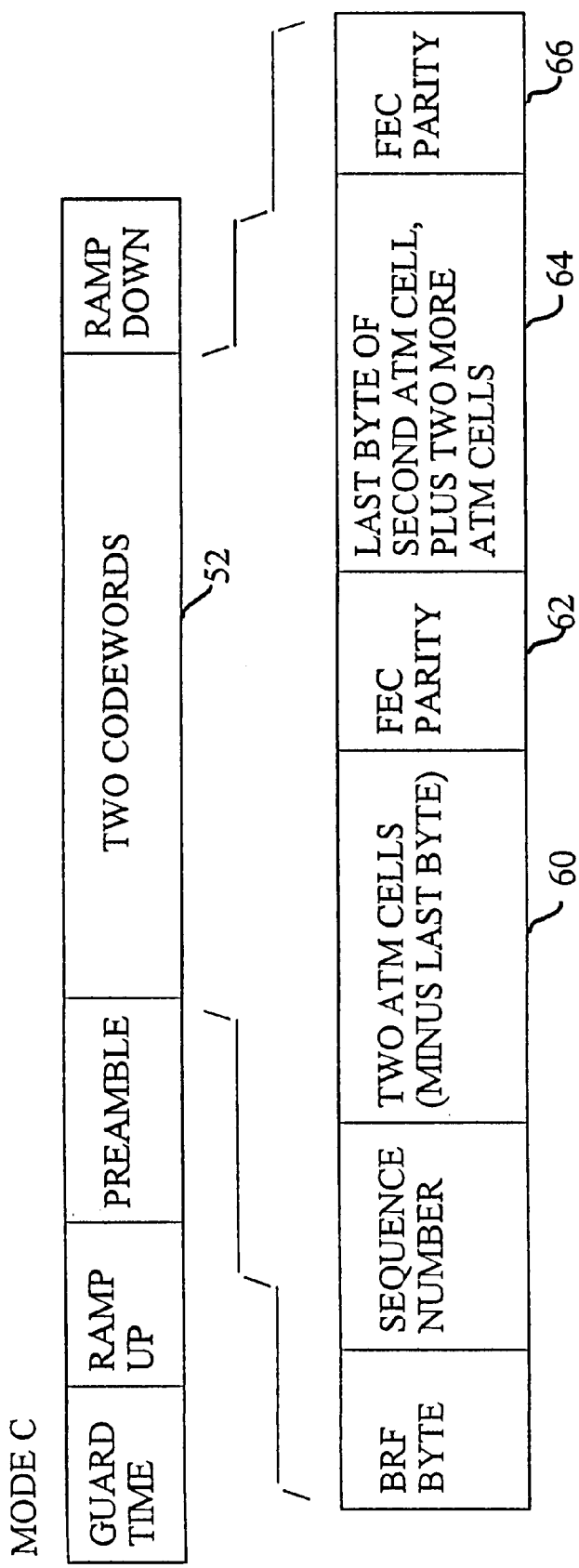
FIG. 4 is a diagram illustrating a burst length mode in which four ATM cells, divided into two equal length codewords, are provided per burst.

FIGS. 2, 3 and 4 illustrate different frame formatting embodiments for three example modes. In particular, FIG. 2 illustrates a burst mode using a single ATM cell per TDMA burst. FIG. 3 illustrates a burst mode in which two ATM cells are provided in one codeword per burst. FIG. 4 illustrates an example in which four ATM cells are provided per burst; divided into two equal length codewords. It should be appreciated that the frame formats illustrated in FIGS. 2–4 are specific examples only, and that other frame structures can be provided in accordance with the present invention, thereby offering a system operator with different burst mode choices to enable the optimization of the bandwidth efficiency/robustness trade-off. A more generalized frame format is discussed later in connection with FIG. 5.

As illustrated in FIG. 2, a burst carrying a single ATM cell 40 includes a guard time 30, ramp up time 32 and preamble 34. A ramp down time 44 is also provided at the end of the burst. One codeword is provided between the preamble 34 and ramp down 44. This codeword includes a BRF byte 36, sequence number 38, the single ATM cell 40 and FEC parity 42. The coding level provided by the FEC parity is adjustable depending on the particular burst mode, in order to increase or decrease the robustness of the communication.

The embodiment of FIG. 3 differs from that of FIG. 2 in that the codeword contains two ATM cells 50 instead of the single ATM cell 40. The embodiment of FIG. 4 differs from that of FIGS. 2 and 3 in that two codewords 52 are provided in the burst. The two codewords comprise the BRF byte and sequence number, as well as two ATM cells (minus the last byte thereof) 60, FEC parity 62 for the ATM cells 60, followed by the last byte of the second ATM cell plus two more ATM cells 64, and associated FEC parity 66.

Figure 5:
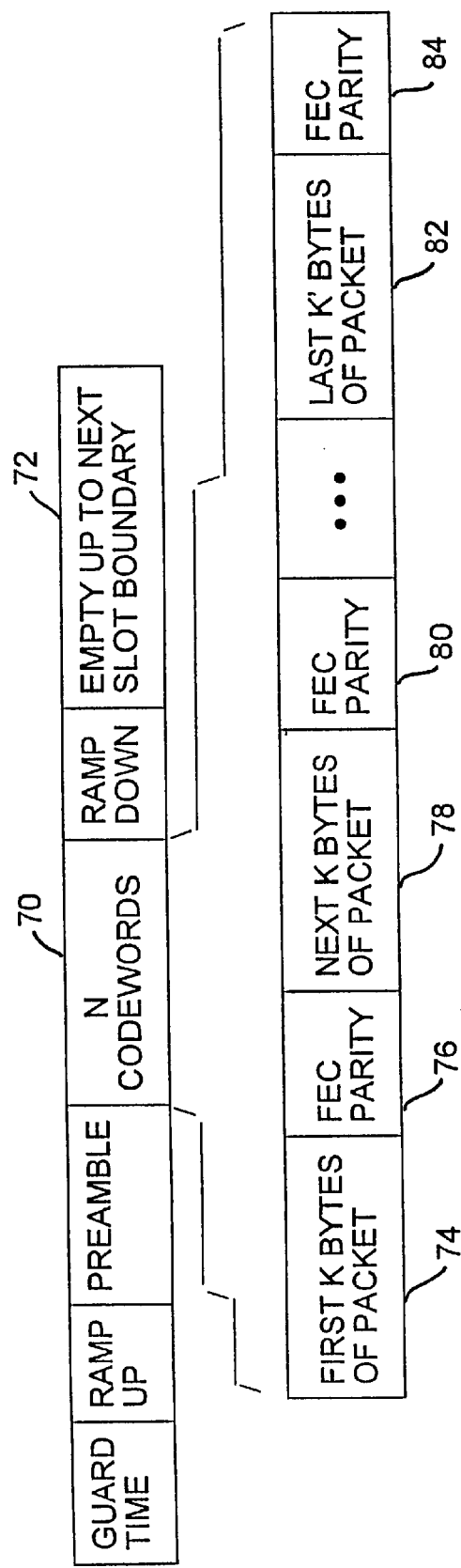
FIG. 5 is a diagram illustrating a generalized burst length mode in accordance with the present invention.

FIG. 5 illustrates a generalized embodiment in which an integer number N of codewords 70 is provided in the burst. In order to allow the use of a codeword size that is independent of the length of data in the burst, the last codeword in the burst may be shortened. In this event, the burst will be empty at its end up to the next slot boundary, as indicated at 72. The N codewords commence with the first K bytes 74 of the packet being transmitted, followed by FEC parity bits 76 for the first K bytes. Then, the next K bytes 78 of the packet are provided, followed by associated FEC parity 80. Additional K byte lengths of the packet follow as necessary, until the last K' bytes are provided at 82. K' may equal K or be less than K. Associated FEC parity follows the last K' bytes 82, as indicated at 84. Thus, the total length L of information bytes of the N codewords 70 can be expressed as L=(N−1)K+K'≤NK.

The bursts transmitted according to the apparatus of FIG. 1 are received by a receiver tuned to the appropriate frequency. The receiver continually scans the received signal at this frequency for the occurrence of bursts of data. A demodulator in the receiver processes all detected bursts of data appearing in its tuned channel. It should be noted that the burst data in the time slots will originate at different transmitters in general. After detecting the presence of a burst of data via filtering tuned to the preamble, the demodulator will further process the received waveform to determine the end of the preamble and the beginning of the data field. Precise carrier acquisition will then be performed, and carrier tracking will commence to facilitate demodulation and detection of the data. The demodulator will perform estimation of the time of arrival of the burst relative to a reference timing signal it is provided, and will estimate the power of the received burst and the signal-to-noise ratio. In the absence of a detected burst, the demodulator will estimate the power in the tuned channel (so that a noise power estimate for that channel is available). Further processing at the receiver consists of decoding the differential encoding induced upon the data portion of the cell (if differential encoding was used at the transmitter). The data is then passed, to a derandomizer and finally to a Reed-Solomon decoder.

A modulator 28 provided at the transmitter (FIG. 1) will provide a modulation type dictated by the burst mode control signal input via interface 15. For example, either QPSK or 16-QAM modulation can be provided. Different portions of the frequency band can be operated in different modes. The majority of the frequencies in the 5–40 MHz band in an HFC plant are expected to have sufficiently low noise-plus-interference and sufficiently high passband fidelity to allow successful 16-QAM operation. QPSK modulation is provided for those bands where the passband distortion and/or available carrier-to-noise (C/N) ratio is not capable of supporting 16-QAM. QPSK has less throughput capability than 16-QAM, but is more robust and allows excellent service to be widely available at low risk.

Multiple symbol rates are offered in the flexible modulation scheme of the present invention. Rates of 128 kilosymbols per second (ksym/sec), 256 ksym/sec, 512 ksym/sec, 1.024 megasymbols per second (Msym/sec), and 2.056 Msym/sec are provided in the embodiments illustrated hereinafter. Additionally, rates of 160 ksym/sec, 320 ksym/sec, 640 ksym/sec, 1.28 Msym/sec and 2.56 Msym/sec are illustrated. A practical system in accordance with the invention could encompass either or both of these sets of symbol rates, as well as others. The slower rates occupy less bandwidth, and thus offer the potential of "fitting" between severe ingress interferers situated such that the wide band modes will not operate. The slower rates also offer less latency without sacrificing throughput when many low rate users vie for service. This is illustrated, for example, with an ATM embodiment wherein infrequent bursts of multiple cells can be assigned to a low rate user. However, due to the sparse spacing of such burst assignments, there is a latency penalty. An increase in symbol rate without increasing the number of PDUs per burst will decrease efficiency, since part of the TDMA overhead does not scale with the symbol rate. Conversely, if more PDUs are bundled into the burst, the latency will increase. Thus, a lower symbol rate can provide better bandwidth efficiency and latency than a higher symbol rate. In addition, for a given reflection scenario, the slower symbol rates will suffer less intersymbol interference degradation than the wide band modulation. Finally, with burst noise duration between one and ten microseconds, the slower symbol rates will suffer fewer symbols impacted by each event, and thus will be more robust in such a scenario, while the shorter symbol duration modulation will have fewer symbols (proportionately) hit by truly impulsive noise. The symbol rate flexibility offers many opportunities to find a successful operational mode in a challenging HFC plant.

Example modes of operation are described in the tables which follow. Table 1 illustrates modes of operation for QPSK at the five symbol rates, with long preambles and abundant FEC parity to provide reliable information in HFC plants, and channels within those plants, with the most demanding impairments and most difficult signal-to-noise ratio (SNR). Within the table, burst formats with one, two and four ATM cells are described. The larger bursts achieve a higher efficiency and/or more robustness, but at the expense of longer latency.

TABLE 1

QPSK Robust Modes of Operation

| | 128 ksym/sec | 256 ksym/sec | 512 ksym/sec | 1,024 Msym/sec | 2,048 Msym/sec |
|---|---|---|---|---|---|
| MINISLOT | | | | | |
| data bytes | 5 | 5 | 5 | 5 | 5 |
| parity bytes | 1 | 1 | 1 | 1 | 1 |
| data symbols | 20 | 20 | 20 | 20 | 20 |
| spacing symbols | 6 | 8 | 8 | 16 | 16 |
| CRC symbols | 4 | 4 | 4 | 4 | 4 |
| preamble symbols | 18 | 16 | 16 | 24 | 24 |
| total symbols | 48 | 48 | 48 | 64 | 64 |
| total burst duration (microseconds) | 375 | 187.5 | 93.75 | 62.5 | 31.25 |
| COMMUNICATION BURST | | | | | |
| ATM cells/burst | 1 | 1 | 1 | 1 | 1 |
| codewords/burst | 1 | 1 | 1 | 1 | 1 |
| errors corrected per codeword | 5 | 5 | 5 | 6 | 6 |
| data symbols | 220 | 220 | 220 | 220 | 220 |
| spacing symbols | 6 | 8 | 8 | 16 | 16 |
| parity symbols | 40 | 40 | 40 | 48 | 48 |
| preamble symbols | 22 | 20 | 20 | 36 | 36 |
| total symbols | 288 | 288 | 288 | 320 | 320 |
| total burst duration (microseconds) | 2250 | 1125 | 562.5 | 312.5 | 156.25 |
| # minislots duration | 6 | 6 | 6 | 5 | 5 |
| information rate (kbps) | 170.7 | 341.3 | 682.7 | 1228.8 | 2457.6 |
| efficiency (bps/Hz) | 1.07 | 1.07 | 1.07 | 0.96 | 0.96 |
| TDMA overhead | 9.7% | 9.7% | 9.7% | 16.2% | 16.2% |
| COMMUNICATION BURST | | | | | |
| ATM cells/burst | 2 | 2 | 2 | 2 | 2 |
| codewords/burst | 1 | 1 | 1 | 1 | 1 |
| errors corrected per codeword | 8 | 8 | 8 | 10 | 10 |
| data symbols | 432 | 432 | 432 | 432 | 432 |
| spacing symbols | 6 | 8 | 8 | 16 | 16 |
| parity symbols | 64 | 64 | 64 | 80 | 80 |
| preamble symbols | 26 | 24 | 24 | 48 | 48 |
| total symbols | 528 | 528 | 528 | 576 | 576 |
| total burst duration (microseconds) | 4125 | 2062.5 | 1031.25 | 562.5 | 281.5 |

TABLE 1-continued

QPSK Robust Modes of Operation

| | 128 ksym/sec | 256 ksym/sec | 512 ksym/sec | 1,024 Msym/sec | 2,048 Msym/sec |
|---|---|---|---|---|---|
| # minislots duration | 11 | 11 | 11 | 9 | 9 |
| information rate (kbps) | 186.2 | 372.4 | 744.7 | 1365.3 | 2730.7 |
| efficiency (bps/Hz) | 1.16 | 1.16 | 1.16 | 1.07 | 1.07 |
| TDMA overhead | 6.1% | 6.1% | 6.1% | 11.1% | 11.1% |
| COMMUNICATION BURST | | | | | |
| ATM cells/burst | 4 | 4 | 4 | 4 | 4 |
| codewords/burst | 1 | 1 | 1 | 2 | 2 |
| errors corrected per codeword | 9 | 9 | 9 | 10 | 10 |
| data symbols | 856 | 856 | 856 | 856 | 856 |
| spacing symbols | 6 | 8 | 8 | 16 | 16 |
| parity symbols | 72 | 72 | 72 | 160 | 160 |
| preamble symbols | 26 | 24 | 24 | 56 | 56 |
| total symbols | 960 | 960 | 960 | 1088 | 1088 |
| total burst duration (microseconds) | 7500 | 3750 | 1875 | 1062.5 | 531.25 |
| # minislots duration | 20 | 20 | 20 | 17 | 17 |
| information rate (kbps) | 204.8 | 409.6 | 819.2 | 1445.6 | 2891.3 |
| efficiency (bps/Hz) | 1.28 | 1.28 | 1.28 | 1.13 | 1.13 |
| TDMA overhead | 3.3% | 3.3% | 3.3% | 6.6% | 6.6% |

Table 2 shows similar examples of highly robust modes of operation with 16-QAM modulation.

TABLE 2

16 QAM Robust Modes of Operation

| | 128 ksym/sec | 256 ksym/sec | 512 ksym/sec | 1,024 Msym/sec | 2,048 Msym/sec |
|---|---|---|---|---|---|
| MINISLOT | | | | | |
| data bytes | 5 | 5 | 5 | 5 | 5 |
| parity bytes | 1 | 1 | 1 | 1 | 1 |
| data symbols | 10 | 10 | 10 | 10 | 10 |
| spacing syMbols | 6 | 8 | 8 | 16 | 16 |
| CRC symbols | 2 | 2 | 2 | 2 | 2 |
| preamble symbols | 30 | 28 | 28 | 36 | 24 |
| total symbols | 48 | 48 | 48 | 64 | 64 |
| total burst duration (microseconds) | 375 | 187.5 | 93.75 | 62.5 | 31.25 |
| COMMUNICATION BURST | | | | | |
| ATM cells/burst | 1 | 1 | 1 | 1 | 1 |
| codewords/burst | 1 | 1 | 1 | 1 | 1 |
| errors corrected per codeword | 10 | 10 | 10 | 7 | 7 |
| data symbols | 110 | 110 | 110 | 110 | 110 |
| spacing symbols | 6 | 8 | 8 | 16 | 16 |
| parity symbols | 40 | 40 | 40 | 28 | 28 |
| preamble symbols | 36 | 34 | 34 | 38 | 38 |
| total symbols | 192 | 192 | 192 | 192 | 192 |
| total burst duration (microseconds) | 1500 | 750 | 375 | 187.5 | 93.75 |
| # minislots duration | 4 | 4 | 4 | 3 | 3 |
| information rate (kbps) | 256.0 | 512.0 | 1024.0 | 2048.0 | 4096.0 |
| efficiency (bps/Hz) | 1.6 | 1.6 | 1.6 | 1.6 | 1.6 |
| TDMA overhead | 21.9% | 21.9% | 21.9% | 28.1% | 28.1% |
| COMMUNICATION BURST | | | | | |
| ATM cells/burst | 2 | 2 | 2 | 2 | 2 |
| codewords/burst | 1 | 1 | 1 | 1 | 1 |
| errors corrected per codeword | 10 | 10 | 10 | 10 | 10 |
| data symbols | 216 | 216 | 216 | 216 | 216 |
| spacing symbols | 6 | 8 | 8 | 16 | 16 |
| parity symbols | 40 | 40 | 40 | 40 | 40 |
| preamble symbols | 26 | 24 | 24 | 48 | 48 |
| total symbols | 288 | 288 | 288 | 320 | 320 |
| total burst duration (microseconds) | 2250 | 1125 | 562.5 | 312.5 | 156.25 |
| # minislots duration | 6 | 6 | 6 | 5 | 5 |
| information rate (kbps) | 341.3 | 682.7 | 1365.3 | 2457.6 | 4915.2 |
| efficiency (bps/Hz) | 2.13 | 2.13 | 2.13 | 1.92 | 1.92 |
| TDMA overhead | 11.1% | 11.1% | 11.1% | 20.0% | 20.0% |
| COMMUNICATION BURST | | | | | |
| ATM cells/burst | 4 | 4 | 4 | 4 | 4 |
| codewords/burst | 2 | 2 | 2 | 2 | 2 |
| errors corrected per codeword | 8 | 8 | 8 | 10 | 10 |
| data symbols | 428 | 428 | 428 | 428 | 428 |
| spacing symbols | 6 | 8 | 8 | 16 | 16 |
| parity symbols | 64 | 64 | 64 | 80 | 80 |
| preamble symbols | 30 | 28 | 28 | 52 | 52 |
| total symbols | 528 | 528 | 528 | 576 | 576 |
| total burst duration (microseconds) | 4125 | 2062.5 | 1031.25 | 562.5 | 281.25 |
| # minislots duration | 11 | 11 | 11 | 9 | 9 |
| information rate (kbps) | 372.4 | 744.7 | 1489.5 | 2732.1 | 5464.2 |
| efficiency (bps/Hz) | 2.33 | 2.33 | 2.33 | 2.13 | 2.13 |
| TDMA overhead | 6.8% | 6.8% | 6.8% | 11.8% | 11.8% |

Tables 3 and 4 provide examples of QPSK and 16-QAM modes of operation for more pristine HFC plants/channels. The examples of Tables 3 and 4 provide shorter preambles and less FEC parity, but correspondingly more throughput capacity (i.e., bandwidth efficiency).

TABLE 3

QPSK Efficient Modes of Operation

| | 128 ksym/sec | 256 ksym/sec | 512 ksym/sec | 1,024 Msym/sec | 2,048 Msym/sec |
|---|---|---|---|---|---|
| MINISLOT | | | | | |
| data bytes | 7 | 6 | 6 | 7 | 7 |
| parity bytes | 1 | 1 | 1 | 1 | 1 |
| data symbols | 28 | 24 | 24 | 28 | 28 |
| spacing symbols | 6 | 8 | 8 | 16 | 16 |
| CRC symbols | 4 | 4 | 4 | 4 | 4 |
| preamble symbols | 10 | 12 | 12 | 16 | 16 |
| total symbols | 48 | 48 | 48 | 64 | 64 |
| total burst duration (microseconds) | 375 | 187.5 | 93.75 | 62.5 | 31.25 |
| COMMUNICATION BURST | | | | | |
| ATM cells/burst | 1 | 1 | 1 | 1 | 1 |
| codewords/burst | 1 | 1 | 1 | 1 | 1 |
| errors corrected per codeword | 1 | 1 | 1 | 1 | 1 |
| data symbols | 220 | 220 | 220 | 220 | 220 |
| spacing symbols | 6 | 8 | 8 | 16 | 16 |
| parity symbols | 8 | 8 | 8 | 8 | 8 |
| preamble symbols | 6 | 8 | 8 | 12 | 12 |

TABLE 3-continued

QPSK Efficient Modes of Operation

|  | 128 ksym/sec | 256 ksym/sec | 512 ksym/sec | 1,024 Msym/sec | 2,048 Msym/sec |
|---|---|---|---|---|---|
| total symbols | 240 | 240 | 240 | 256 | 256 |
| total burst duration (microseconds) | 1875 | 937.5 | 468.75 | 250 | 125 |
| # minislots duration | 5 | 5 | 5 | 4 | 4 |
| information rate (kbps) | 204.8 | 409.6 | 819.2 | 1536.0 | 3072.0 |
| efficiency (bps/Hz) | 1.28 | 1.28 | 1.28 | 1.20 | 1.20 |
| TDMA overhead | 5.0% | 5.0% | 5.0% | 10.9% | 10.9% |
| COMMUNICATION BURST |  |  |  |  |  |
| ATM cells/burst | 2 | 2 | 2 | 2 | 2 |
| codewords/burst | 1 | 1 | 1 | 1 | 1 |
| errors corrected per codeword | 4 | 4 | 4 | 6 | 6 |
| data symbols | 432 | 432 | 432 | 432 | 432 |
| spacing symbols | 6 | 8 | 8 | 16 | 16 |
| parity symbols | 32 | 32 | 32 | 48 | 48 |
| preamble symbols | 10 | 8 | 8 | 16 | 16 |
| total symbols | 480 | 480 | 480 | 512 | 512 |
| total burst duration (microseconds) | 3750 | 1875 | 937.5 | 500 | 250 |
| # minislots duration | 10 | 10 | 10 | 8 | 8 |
| information rate (kbps) | 204.8 | 409.6 | 819.2 | 1536.0 | 3072.0 |
| efficiency (bps/Hz) | 1.28 | 1.28 | 1.28 | 1.20 | 1.20 |
| TDMA overhead | 3.3% | 3.3% | 3.3% | 6.25% | 6.25% |
| COMMUNICATION BURST: |  |  |  |  |  |
| ATM cells/burst | 4 | 4 | 4 | 4 | 4 |
| codewords/burst | 1 | 1 | 1 | 1 | 1 |
| errors corrected per codeword | 5 | 5 | 5 | 9 | 9 |
| data symbols | 856 | 856 | 856 | 856 | 856 |
| spacing symbols | 6 | 8 | 8 | 16 | 16 |
| parity symbols | 40 | 40 | 40 | 72 | 72 |
| preamble symbols | 10 | 8 | 8 | 16 | 16 |
| total symbols | 912 | 912 | 912 | 960 | 960 |
| total burst duration (microseconds) | 7125 | 3562.5 | 1781.25 | 937.5 | 468.75 |
| # minislots duration | 19 | 19 | 19 | 15 | 15 |
| information rate (kbps) | 215.6 | 431.2 | 862.3 | 1638.4 | 3276.8 |
| efficiency (bps/Hz) | 1.35 | 1.35 | 1.35 | 1.28 | 1.28 |
| TDMA overhead | 1.8% | 1.8% | 1.8% | 3.3% | 3.3% |

TABLE 4

16 QAM Efficient Modes of Operation

|  | 128 ksym/sec | 256 ksym/sec | 512 ksym/sec | 1,024 Msym/sec | 2,048 Msym/sec |
|---|---|---|---|---|---|
| MINISLOT |  |  |  |  |  |
| data bytes | 6 | 6 | 6 | 7 | 7 |
| parity bytes | 1 | 1 | 1 | 1 | 1 |
| data symbols | 12 | 12 | 12 | 14 | 14 |
| spacing symbols | 6 | 8 | 8 | 16 | 16 |
| CRC symbols | 2 | 2 | 2 | 2 | 2 |
| preamble symbols | 12 | 10 | 10 | 16 | 16 |
| total symbols | 32 | 32 | 32 | 48 | 48 |
| total burst duration (microseconds) | 250 | 125 | 62.5 | 46.875 | 23.4375 |
| COMMUNICATION BURST |  |  |  |  |  |
| ATM cells/burst | 1 | 1 | 1 | 1 | 1 |

TABLE 4-continued

16 QAM Efficient Modes of Operation

|  | 128 ksym/sec | 256 ksym/sec | 512 ksym/sec | 1,024 Msym/sec | 2,048 Msym/sec |
|---|---|---|---|---|---|
| codewords/burst | 1 | 1 | 1 | 1 | 1 |
| errors corrected per codeword | 6 | 6 | 6 | 2 | 2 |
| data symbols | 110 | 110 | 110 | 110 | 110 |
| spacing symbols | 6 | 8 | 8 | 16 | 16 |
| parity symbols | 24 | 24 | 24 | 8 | 8 |
| preamble symbols | 20 | 18 | 18 | 10 | 10 |
| total symbols | 160 | 160 | 160 | 144 | 144 |
| total burst duration (microseconds) | 1250 | 625 | 312.5 | 140.625 | 70.3125 |
| # minislots duration | 5 | 5 | 5 | 3 | 3 |
| information rate (kbps) | 307.2 | 614.4 | 1288.8 | 2730.7 | 5461.3 |
| efficiency (bps/Hz) | 1.92 | 1.92 | 1.92 | 2.13 | 2.13 |
| TDMA overhead | 16.25% | 16.25% | 16.25% | 18.1% | 18.1% |
| COMMUNICATION BURST |  |  |  |  |  |
| ATM cells/burst | 2 | 2 | 2 | 2 | 2 |
| codewords/burst | 1 | 1 | 1 | 1 | 1 |
| errors corrected per codeword | 5 | 5 | 5 | 8 | 8 |
| data symbols | 216 | 216 | 216 | 216 | 216 |
| spacing symbols | 6 | 8 | 8 | 16 | 16 |
| parity symbols | 20 | 20 | 20 | 32 | 32 |
| preamble symbols | 14 | 12 | 12 | 24 | 24 |
| total symbols | 256 | 256 | 256 | 288 | 288 |
| total burst duration (microseconds) | 2000 | 1000 | 500 | 281.25 | 140.625 |
| # minislots duration | 8 | 8 | 8 | 6 | 6 |
| information rate (kbps) | 384.0 | 768.0 | 1536.0 | 2730.7 | 5461.3 |
| efficiency (bps/Hz) | 2.4 | 2.4 | 2.4 | 2.13 | 2.13 |
| TDMA overhead | 7.8% | 7.8% | 7.8% | 13.9% | 13.9% |
| COMMUNICATION BURST |  |  |  |  |  |
| ATM cells/burst | 4 | 4 | 4 | 4 | 4 |
| codewords/burst | 1 | 1 | 1 | 2 | 2 |
| errors corrected per codeword | 8 | 8 | 8 | 8 | 8 |
| data symbols | 428 | 428 | 428 | 428 | 428 |
| spacing symbols | 6 | 8 | 8 | 16 | 16 |
| parity symbols | 32 | 32 | 32 | 64 | 64 |
| preamble symbols | 14 | 12 | 12 | 20 | 20 |
| total symbols | 480 | 480 | 480 | 528 | 528 |
| total burst duration (microseconds) | 3750 | 1875 | 937.5 | 515.625 | 257.8125 |
| # minislots duration | 15 | 15 | 15 | 11 | 11 |
| information rate (kbps) | 409.6 | 819.2 | 1638.4 | 2978.9 | 5957.8 |
| efficiency (bps/Hz) | 2.56 | 2.56 | 2.56 | 2.33 | 2.33 |
| TDMA overhead | 4.2% | 4.2% | 4.2% | 6.8% | 6.8% |

Scanning the values in the tables, it can be seen that providing various burst modes in accordance with the present invention provides both robust operation (large preambles and lots of parity) to work in the most difficult channels, and also provides the efficient modes characterized by TDMA overhead of only a few percent. In fact, the tables show modes of up to four ATM cells per burst. However, it is envisioned that up to 20 or more ATM cells, or multiple other long PDUs totaling many hundreds of bytes of information, can be combined in a single burst, providing even less TDMA overhead (or alternatively, high bandwidth efficiency) than the lowest values given in Tables 3 and 4.

As indicated, the frame structure for each mode includes spacing between bursts for filter ramp up/down for the 0.25 Square-Root-Raised-Cosine pulse shaping, plus guard time to allow for some timing error for different message providers with abutting time slots. With the allowed guard time in each burst, under worst case timing conditions, the center of the last symbol of one burst and the center of the first symbol of the following burst will be separated by at least five symbols. The guard time allowance varies with the symbol rate as follows:

| Symbol Rate (ksym/sec) | # Symbols Guard Time per Burst | Allocated Burst Timing Error (microseconds) |
|---|---|---|
| 128 | 1 | ±3.9 |
| 256 | 3 | ±5.9 |
| 512 | 3 | ±2.9 |
| 1024 | 11 | ±5.4 |
| 2048 | 11 | ±2.7 |

As an example, in the 2.048 Msym/sec mode, besides the data, parity, and preamble symbols, there are 16 extra symbols added to the burst time; 11 for guard time to allow for timing error of ±5½ symbols, and 5 symbols to provide the minimum guaranteed spacing at the demodulator detector.

In each communications burst there is at least one ATM cell, and possibly more, as given in the tables. Besides the 53 bytes of each ATM cell, the burst carries two additional bytes of data: the ID byte used for ARQ and the BRF byte used for "bandwidth" request. Minislots for each symbol rate are also provided, and contain 5 or more bytes of data, and one byte CRC, in addition to the preamble and spacing symbols.

The information rates shown in the tables account for the 48 bytes of payload data in the ATM cells, and indicate how many bits (at 48*8 per ATM cell) a user will transfer if given all the time slots in a channel operating in the given mode. The efficiency in bps/Hz is the information rate just described divided by the intended minimum channel spacing, which is 1.25* (symbol rate) for each mode. The TDMA overhead accounts for the spacing symbols and preamble symbols, as a percentage of the total burst time. Note that the 5 header bytes of each ATM cell and the two signaling bytes (ID Byte and BRF Byte) are not counted as TDMA overhead in this computation, and neither is the parity. (To account for these factors as well, simply take the efficiency value reported in the table, and normalize by 2 for QPSK or 4 for 16QAM. This represents the percentage of information bits out of the total available at the symbol rate with continuous modulation and no FEC overhead, etc.; subtracting this amount from one yields a totalistic view of "overhead").

Tables 5 and 6 illustrate example modes of operation for symbol rates of 160 ksym/sec and 2.56 Msym/sec.

TABLE 5

QPSK Operation

| | 160 ksym/sec | 2.56 Msym/sec |
|---|---|---|
| MINISLOT | | |
| spacing symbols (bytes) | 8 (2) | 16 (4) |
| data symbols (bytes) | 28 (7) | 28 (7) |

TABLE 5-continued

QPSK Operation

| | 160 ksym/sec | 2.56 Msym/sec |
|---|---|---|
| CRC symbols (bytes) | 4 (1) | 4 (1) |
| preamble symbols (bytes) | 20 (5) | 16 (4) |
| total symbols (bytes) | 60 (15) | 64 (16) |
| total burst duration (microseconds) | 375 | 25 |
| COMMUNICATION BURST | | |
| codewords/burst | 1* | 1* |
| errors corrected per codeword | 4 | 4 |
| spacing symbols (bytes) | 8 (2) | 16 (4) |
| data symbols (bytes) | 128 (32) | 160 (40) |
| parity symbols (bytes) | 32 (8) | 32 (8) |
| preamble symbols (bytes) | 32 (8) | 48 (12) |
| total symbols (bytes) | 200 (50) | 256 (64) |
| total burst duration (microseconds) | 1250 | 100 |
| COMMUNICATION BURST | | |
| codewords/burst | 1* | 1* |
| errors corrected per codeword | 7 | 4 |
| spacing symbols (bytes) | 8 (2) | 16 (4) |
| data symbols (bytes) | 224 (56) | 224 (56) |
| parity symbols (bytes) | 56 (14) | 32 (8) |
| preamble symbols (bytes) | 32 (8) | 48 (12) |
| total symbols (bytes) | 320 (80) | 320 (80) |
| total burst duration (microseconds) | 2000 | 125 |
| COMMUNICATION BURST | | |
| codewords/burst | 1* | 1* |
| errors corrected per codeword | 10 | 10 |
| spacing symbols (bytes) | 8 (2) | 16 (4) |
| data symbols (bytes) | 880 (220) | 880 (220) |
| parity symbols (bytes) | 80 (20) | 80 (20) |
| preamble symbols (bytes) | 32 (8) | 48 (12) |
| total symbols (bytes) | 1000 (250) | 1024 (256) |
| total burst duration (microseconds) | 6250 | 400 |

*The numbers in the table are given for a single codeword, but more codewords can be added, with the same data and parity lengths as given in the table, to create longer bursts.

TABLE 6

16 QAM Operation

| | 160 ksym/sec | 2.56 Msym/sec |
|---|---|---|
| COMMUNICATION BURST | | |
| codewords/burst | 1* | 1* |
| errors corrected per codeword | 4 | 4 |
| spacing symbols (bytes) | 8 (4) | 16 (8) |
| data symbols (bytes) | 64 (32) | 80 (40) |
| parity symbols (bytes) | 16 (8) | 16 (8) |
| preamble symbols (bytes) | 32 (16) | 48 (24) |
| total symbols (bytes) | 120 (60) | 160 (80) |
| total burst duration (microseconds) | 750 | 62.5 |
| COMMUNICATION BURST | | |
| codewords/burst | 1* | 1* |
| errors corrected per codeword | 7 | 4 |
| spacing symbols (bytes) | 8 (4) | 16 (8) |
| data symbols (bytes) | 112 (56) | 112 (56) |
| parity symbols (bytes) | 28 (14) | 16 (8) |
| preamble symbols (bytes) | 32 (16) | 48 (24) |
| total symbols (bytes) | 180 (90) | 192 (96) |
| total burst duration (microseconds) | 1125 | 75 |
| COMMUNICATION BURST | | |
| codewords/burst | 1* | 1* |
| errors corrected per codeword | 10 | 10 |
| spacing symbols (bytes) | 8 (4) | 16 (8) |
| data symbols (bytes) | 440 (220) | 440 (220) |

TABLE 6-continued

16 QAM Operation

|  | 160 ksym/sec | 2.56 Msym/sec |
|---|---|---|
| parity symbols (bytes) | 40 (20) | 40 (20) |
| preamble symbols (bytes) | 32 (16) | 48 (24) |
| total symbols (bytes) | 520 (260) | 544 (272) |
| total burst duration (microseconds) | 3250 | 212.5 |

*The numbers in the table are given for a single codeword, but more codewords can be added, with the same data and parity lengths as given in the table, to create longer bursts.

The guard time allowance varies with the symbol rate as follows:

| Symbol Rate (ksym/sec) | # Symbols Guard Time per Burst | Allocated Burst Timing Error (microseconds) |
|---|---|---|
| 160** | 3 | ±9.4 |
| 320 | 3 | ±4.7 |
| 640 | 3 | ±2.3 |
| 1280 | 11 | ±4.3 |
| 2560** | 11 | ±2.1 |

**Only these symbol rates are shown in the Tables.

It should now be appreciated that the present invention provides a flexible F/TDMA transmission scheme for robust and efficient communication of data. An interface is provided for controlling transmission apparatus to provide a desired combination of frequency agile modulation, multiple symbol rates, FEC coding, and data stream framing structure. The scheme enables units such as ATM cells, MPEG packets, and the like to be delivered at rates per user ranging from tens of kbps to greater than the rates currently provided by T1 telephone lines, with acceptable error rate performance. Minislots on each frequency channel are also accommodated, and can be used for improving media access control (MAC) performance, or for support of constant bit rate services in a fashion more efficient than embedding in ATM.

In a specific disclosed embodiment, the flexibility of five symbol rates (128 ksym/sec up to 2.048 Msym/sec, in steps of factors of 2) is provided, together with Reed-Solomon FEC over GF(256) with selection of 0–10 byte error correction capability, with one or more codewords per burst, and with codeword length up to 255 bytes (with flexibility to shorten), and programmable preamble length and values. The disclosed burst modes also include a minislot with a programmable data field length, preamble length and values, and an eight-bit CRC without FEC. Preferably, operation on any frequency channel would consist of the use of one minislot format and only one burst format.

The provision of various burst format options in accordance with the present invention, even for a given symbol rate, enable a trade-off to be made between throughput (efficiency), error rate performance (physical layer robustness) and latency. With the additional flexibility of symbol rate, QPSK or 16-QAM modulation, and frequency agility, a user of the system such as a cable television operator, will be able to find a satisfactory set of operational modes for a broad set of conditions encountered.

Although the invention has been described in connection with various disclosed embodiments, it should be appreciated that various adaptations and modifications may be made thereto without departing from the scope of the invention as set forth in the claims.

What is claimed is:

1. Apparatus for communicating data packets in variable length bursts over a physical layer in a multilayer data communication scheme, each burst containing (i) information data and (ii) overhead including forward error control (FEC) data, said apparatus comprising:
    a programmable block processor for grouping said information data into blocks according to a selected one of a plurality of available grouping modes;
    a programmable FEC encoder for encoding said blocks with said FEC data according to a selected one of a plurality of possible coding levels; and
    an interface associated with said block processor and said FEC encoder for:
        selecting a burst mode that uses a particular grouping mode provided by said block processor and a particular coding level established by said FEC encoder to achieve an associated transmission bandwidth efficiency and burst transmission robustness over said physical layer for bursts containing said blocks.

2. Apparatus in accordance with claim 1 further comprising a programmable modulator for modulating the encoded blocks for transmission according to one of a plurality of available modulation modes, said modulator being responsive to the burst mode selected via said interface for providing a particular one of said modulation modes.

3. Apparatus in accordance with claim 2 wherein said modulation modes include QPSK and QAM.

4. Apparatus in accordance with claim 1 wherein said bursts are transmitted using time and frequency division multiple access (F/TDMA) with frequency agility over a communication channel.

5. Apparatus in accordance with claim 1 wherein each of said grouping modes is associated with a particular symbol rate for the transmission of symbols carried by said bursts.

6. Apparatus in accordance with claim 5 wherein:
    said block processor blocks protocol data units (PDUs) containing said information data into units independent of the PDU length and provides a preamble of a selected length in response to the burst mode selected via said interface; and
    said FEC encoder encodes data from said units into a number of codewords dictated by the selected burst mode.

7. Apparatus in accordance with claim 6 wherein said FEC encoder is programmable to provide codewords of different lengths.

8. Apparatus in accordance with claim 6 further comprising an interleaver for interleaving codeword symbols whenever said FEC encoder encodes said blocks into two or more codewords.

9. Apparatus in accordance with claim 6 further comprising a programmable modulator for modulating the encoded blocks for transmission according to one of a plurality of available modulation modes, said modulator being responsive to the burst mode selected via said interface for providing a particular one of said modulation modes.

10. Apparatus in accordance with claim 9 wherein said modulation modes include QPSK and QAM.

11. Apparatus in accordance with claim 6 wherein said block processor allows a final unit derived from the PDUs whose data is contained in a burst to be shorter than previous units contained in the burst.

12. Apparatus in accordance with claim 1 wherein said blocks comprise asynchronous transfer mode (ATM) cells, and said block processor allocates a particular number of said cells to each block based on the burst mode selected via said interface.

13. Apparatus in accordance with claim 12 wherein said block processor allocates either 1, 2 or 4 cells per block depending on the burst mode selected via said interface.

14. Apparatus in accordance with claim 1 wherein said burst mode is additionally selected to achieve an associated latency for bursts containing said blocks.

15. Apparatus in accordance with claim 1 wherein:
said block processor provides modes of varying burst length, each having one codeword per burst; and
said bursts are convolutionally,coded using at least one of a convolutional FEC code and trellis coded modulation.

16. Apparatus in accordance with claim 15 wherein said convolutional coding is provided as an inner code concatenated with an error-correcting outer code.

17. A method for communicating data packets in variable length bursts over a physical layer in a multilayer data communication scheme, each burst containing (i) information data and (ii) overhead including forward error control (FEC) data, comprising the steps of:
providing a plurality of different burst modes, each specifying an information data grouping mode and an FEC coding level;
selecting one of said burst modes;
grouping said information data into blocks according to the grouping mode specified by the selected burst mode; and
encoding said blocks with said FEC data according to the coding level specified by the selected burst mode; wherein said burst mode is selected to achieve an associated transmission bandwidth efficiency and burst transmission robustness over said physical layer for bursts containing said blocks.

18. A method in accordance with claim 17 wherein said burst mode is additionally selected to achieve an associated latency for bursts containing said blocks.

19. A method in accordance with claim 18 wherein the burst mode is selected based on a trade-off between at least two of bandwidth efficiency, burst transmission robustness and latency.

20. A method in accordance with claim 19 wherein said trade-off comprises at least one of the following:
(a) a trade-off between robustness and efficiency by varying a block code length and code rate;
(b) a trade-off between robustness and efficiency by varying a preamble length;
(c) a trade-off between latency and efficiency by bundling protocol data units (PDUs);
(d) a trade-off between efficiency and robustness at the cost of latency by lengthening and bundling codewords for short PDUs; and
(e) a trade-off between efficiency and robustness by shortening codewords for long PDUs and coarse slot boundaries.

* * * * *